United States Patent [19]

Schroeder et al.

[11] Patent Number: 4,539,841
[45] Date of Patent: Sep. 10, 1985

[54] METHOD OF DETERMINING ENGINE CYLINDER COMPRESSION PRESSURE AND POWER OUTPUT

[75] Inventors: Thaddeus Schroeder, Sterling Heights; William P. Ryan, Royal Oak, both of Mich.

[73] Assignee: General Motors Corporation, Detroit, Mich.

[21] Appl. No.: 579,724

[22] Filed: Feb. 13, 1984

[51] Int. Cl.³ .......................................... G01M 15/00
[52] U.S. Cl. ...................... 73/116; 73/115; 73/862
[58] Field of Search .................. 73/116, 115, 862; 364/551

[56] References Cited

U.S. PATENT DOCUMENTS

4,050,296  9/1977  Benedict ............................. 73/116
4,179,922  12/1979  Bouverie et al. .................... 73/116

Primary Examiner—Jerry W. Myracle
Attorney, Agent, or Firm—Howard N. Conkey

[57] ABSTRACT

A method of diagnosing the peak compression pressure and power output of individual cylinders of an internal combustion engine based on stored normalized energy coefficients derived from a normalized pressure curve and the measured instantaneous engine speed.

4 Claims, 8 Drawing Figures

METHOD OF DETERMINING ENGINE CYLINDER COMPRESSION PRESSURE AND POWER OUTPUT

This invention relates to an improved method for determining the peak pressure due to compression and the net power output from individual cylinders in an internal combustion engine.

Presently, diagnostic routines for internal combustion engines are time-consuming and complex. A typical test procedure for a diesel engine includes step-by-step checks of the fuel system and many times requires the removal and testing of individual fuel system components. For example, a procedure for testing a diesel engine may include first checking the fuel system for leaks, air in the fuel, and contaminated fuel. Then the test procedure may call for checking injection timing and engine idle speed. If the problem is still undetected, the next step may involve the individual removal and testing of the injectors. If the injector test fails to locate the problem, a compression check on each cylinder may then be performed generally employing an intrusive pressure sensing device. Finally, if the problem has not been revealed by the compression check, the procedure may call for removal and replacement of the injector pump. The foregoing procedure typically would require a service technician up to seven hours to perform.

While numerous diagnostic systems and procedures have been devised in order to minimize the time and expense involved in testing and diagnosing problems in internal combustion engines, they still generally involve or require intrusive sensing devices and generally require removal and testing of individual components in order to isolate failures.

It is the general object of this invention to provide an improved method of testing internal combustion engines.

It is another object of this invention to provide for an engine diagnostic procedure for isolating engine faults based on a single input of instantaneous engine speed and various stored engine related parameters.

It is another object of this invention to provide an internal combustion engine diagnostic procedure for determining the peak cylinder pressure due to compression and the relative power output of each cylinder from the instantaneous engine idle speed and predetermined stored engine related parameters.

The foregoing and other objects of this invention may be best understood by reference to the following description of a preferred embodiment of the invention and the drawings in which.

The preferred embodiment of the invention will be described with respect to a 4-cylinder diesel engine 10 generally illustrated in FIG. 1. The engine 10 includes a ring gear 12 mounted on and rotated by the engine crankshaft 14 and which has teeth equally spaced around its circumference at typically 2 to 4 degree intervals.

Figure 2:
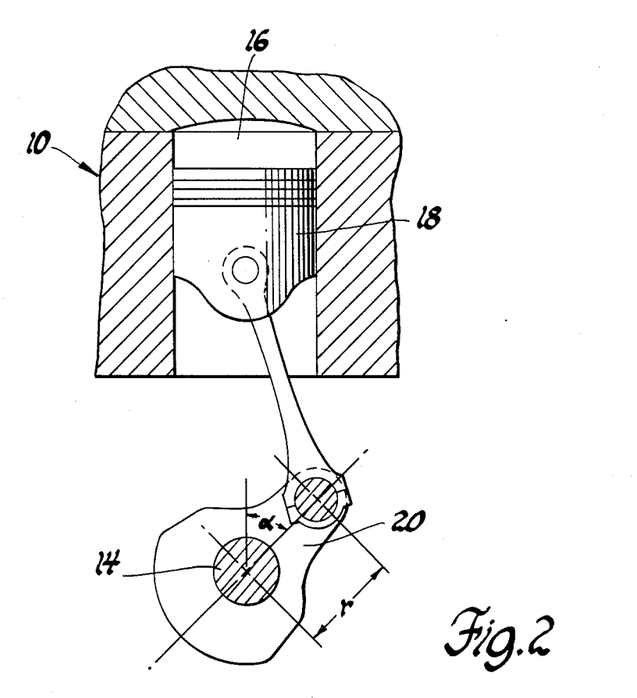
FIG. 2 illustrates the relationship of a piston and crankshaft in the engine of FIG. 1.

The rotational force transmitted to the crankshaft 14 is provided by the combustion of an air and fuel mixture in each of the engine combustion chambers causing the crankshaft to rotate. Referring to FIG. 2, the configuration of one of the cylinders of the engine 10 and its relationship to the crankshaft 14 is illustrated. The rotational force transmitted to the crankshaft 14 is a function of the pressure in the combustion chamber 16, the area of the face of the piston 18, the length of the lever arm 20 attached to the crankshaft 14 and the angle $\alpha$ between the arm 20 and its position at top dead center of the piston 18.

The torque produced by the cylinder of FIG. 2 is defined by the expression $$T(\alpha) = P(\alpha) S C_T(\alpha) r \qquad (1)$$

where $T(\alpha)$ is the torque produced at a given angle $\alpha$, $P(\alpha)$ is the pressure in the chamber 16 at the angle $\alpha$, S is the area of the face of the piston 18, $C_T(\alpha)$ is the tangential coefficient of the cylinder at the angle $\alpha$ and r is the radius of the lever arm 20. The tangential coefficient $C_T$ is determined by the geometry of the engine and translates the force exerted on the face of the piston 18 to the component of the force tending to rotate the crankshaft 14.

Figure 6:
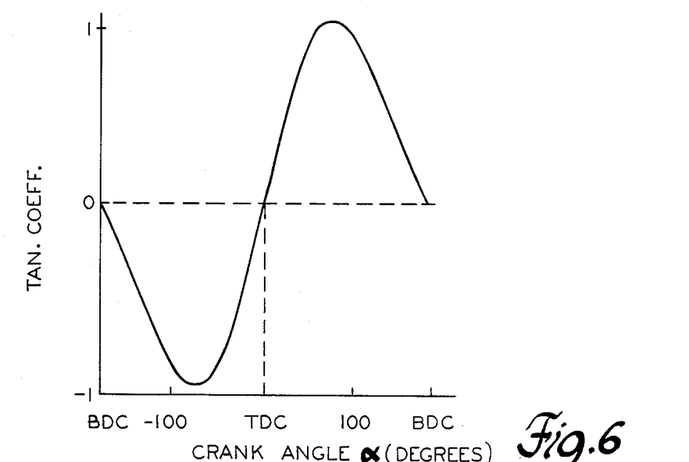
FIG. 6 is a plot of the tangential coefficient for each of the cylinders of the engine of FIG. 1.

A typical value for $C_T$ for each cylinder of the engine is illustrated in FIG. 6. Before piston top dead center and after piston bottom dead center, $C_T$ is negative since any force on the piston face exerts a negative or counter-rotational force on the crankshaft 14. It follows then that $C_T$ is positive after piston top dead center and before piston bottom dead center. $C_T$ is zero at both piston top dead center ($\alpha = 0°$) and bottom dead center ($\alpha = \pm 180°$) and has a maximum absolute magnitude at some intermediate crankshaft angle.

Figure 4:
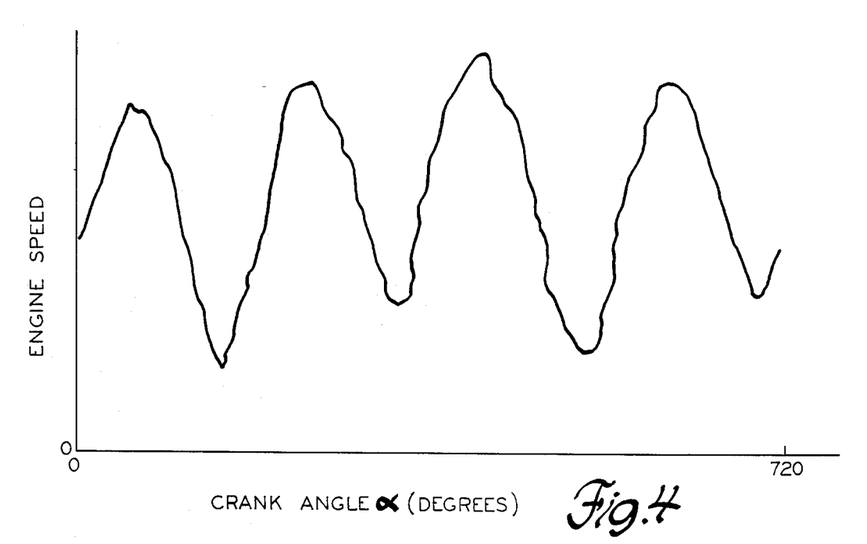
FIG. 4 is a diagram illustrating a typical trace of engine speed over one complete engine cycle.

Positive rotational torque is imparted to the crankshaft 14 during the power stroke of each cylinder of the engine 10 due to the ignition and combustion of an air and fuel mixture in the combustion chambers. A negative rotational torque is imparted to the crankshaft 14 by each cylinder during its compression stroke. The cyclic compression and combustion of the air-fuel mixture in the cylinders in sequence generates power in a cyclic fashion causing cyclic variations in the engine speed. While these speed cycles are minimized by the engine flywheel, they can easily be measured, especially at engine idle speed. The curve of FIG. 4 is illustrative of the cyclic variation in the speed of an internal combustion engine as the engine rotates through two revolutions of the crankshaft 14. Each of the speed cycles corresponds to the compression and power strokes of a particular cylinder. The intervals of decreasing speed are related to the compression stroke while intervals of increasing speed are related to the power stroke. In a 4-cycle engine, the number of speed cycles in two crankshaft revolutions is equal to the number of cylinders. In this embodiment, the engine 10 of FIG. 1 is a 4-cylinder engine so that there are 4 complete speed cycles over 720 degrees of rotation of the crankshaft 14. Each minimum speed point of the speed cycles illustrated in FIG. 4 nearly coincides with a corresponding piston top dead center location.

In accord with this invention, we have recognized that the shape or configuration of the pressure curve (as opposed to magnitude) is substantially the same for all cylinders of all engines of the same type and that if this pressure curve is normalized so as to have an amplitude of unity, the normalized pressure curve is a constant for all the engines of the same type. From these normalized pressure curves, certain normalized energy coefficients may be derived which, along with other known engine parameters, allow the determination of the peak pressure due to compression and the power output from each cylinder of the engine 10 by observing only the instantaneous speed variation of the engine.

Figure 3:
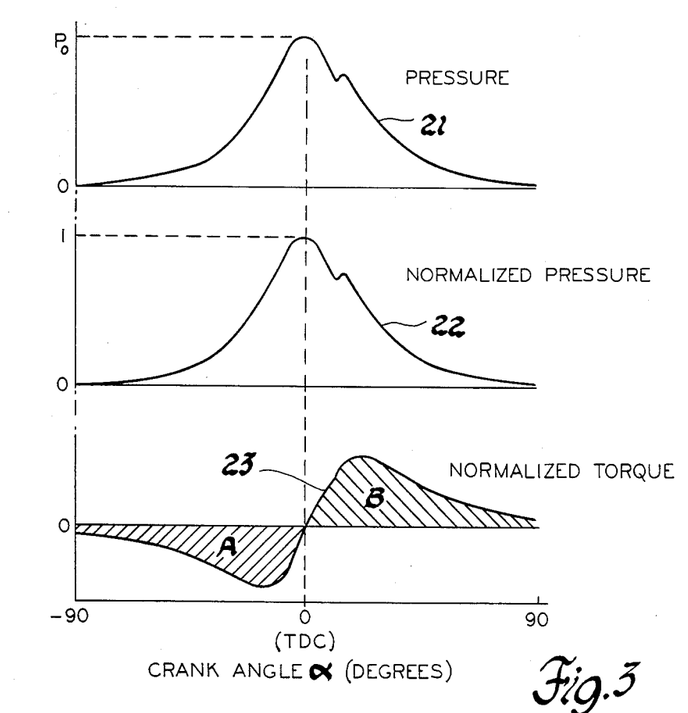
FIG. 3 are curves illustrating the pressure, normalized pressure and normalized torque utilized in accord with the principles of this invention in determining the pressure due to compression and power output of individual cylinders of the engine of FIG. 1.

The determination of the normalized energy coefficient will first be described. The curve 21 of FIG. 3 illustrates the pressure in the combustion chamber of one of the cylinders of the engine 10 during the compression and power stroke. Top dead center of the piston in this cylinder is arbitrarily assigned the crank angle $\alpha = 0°$. In this example, the combustion timing in the cylinder is after top dead center so that the peak pressure $P_o$ is the peak compression pressure and occurs near $\alpha = 0°$, the piston top dead center location.

From the pressure curve 21, a normalized pressure curve 22 having a peak value of unity is developed by dividing the pressure values in the curve 21 by the peak pressure value $P_o$. The relationship between the normalized pressure value and the actual pressure value at a crank angle $\alpha$ is defined by the expression $$P(\alpha) = P_o P_n(\alpha) \tag{2}$$

where $P(\alpha)$ is the actual measured pressure in the combustion chamber 16 at crank angle $\alpha$ and $P_n(\alpha)$ is the normalized pressure value at the crankshaft angle $\alpha$.

From the normalized pressure curve 22 a normalized torque curve 23 is developed by multiplying the normalized pressure value at each angle by the tangential coefficient $C_T$ at each angle $\alpha$. The normalized torque is defined by the expression $$T_n(\alpha) = P_n(\alpha) C_T(\alpha). \tag{3}$$

The normalized torque curve 23 spans the 180° duration of the pressure curve 21.

From the normalized torque curve 23 of FIG. 3, a normalized energy coefficient A that is related to the compression phase of a cylinder is determined. This coefficient is the integral of the normalized torque over an angular interval from some specified angle before top dead center to top dead center. The maximum interval for an engine with X number of cylinders is 360°/X. In the present embodiment where the engine 10 has four cylinders, the maximum interval over which the curve 23 is integrated to establish the normalized energy coefficient A is 90°. This interval is used in the preferred embodiment so that the normalized energy coefficient is defined by the expression:

$$A = \int_{-90}^{0} T_n(\alpha) d\alpha. \tag{4}$$

Since the normalized energy coefficient A is developed from a normalized pressure curve whose general shape is a constant for each cylinder of all engines of the same type, particularly in the compression phase, it is also a constant for all engines of the same type. In the preferred embodiment, the coefficient A was developed from the cylinder pressure measured while injection timing was after top dead center so that it reflected precisely the shape of the compression pressure curve. However, the coefficient A is applicable in a subsequent diagnostic procedure on an engine whose timing is before top dead center because in the vicinity of top dead center the tangential coefficient $C_T$ is at or near zero. The result is that pressure variations around top dead center have little influence on torque.

A normalized energy coefficient B which is the integral of the normalized torque curve over the 90° interval after top dead center is applicable to the power phase of the pressure curve 21. However, it is related to a particular cylinder combustion condition including timing, air/fuel ratio, etc. As will be described, this normalized energy coefficient B will be determined for the particular combustion condition in a particular cylinder during a diagnostic procedure to determine the power output of that cylinder.

In addition to the normalized energy coefficient A, two other engine operating parameters related to the engine type are also determined to be later used in the engine diagnostic procedures. The first is the total load torque $T_L$ (including engine friction) of the engine at idle. This load torque is a function of idle speed and a schedule of those values as a function of idle speed is determined. Any of the well known methods of determining the load torque may be utilized. In one method, the engine is connected to a large inertia which can be assumed to represent the total moment of inertia. Knowing the inertia, the load torque may then be computed.

The second engine operating parameter to be determined is the equivalent moment of inertia I of the engine. This is generally a known engine design parameter. However, if not known, it can be determined by conventional techniques.

From the determined normalized energy coefficient A, the equivalent moment of inertia I and the total load torque $T_L$, the peak pressure due to compression and the power output of each of the cylinders of the engine 10 may be determined solely by monitoring the instantaneous speed of the engine 10. This may be demonstrated with reference to FIG. 5 in which the upper curve 24 illustrates the instantaneous speed of the engine 10 corresponding to the compression and combustion phases of cylinder number i. The decreasing speed from the crank angle 90° before top dead center is due to the compression of the cylinder and the increasing speed after top dead center is due to the power stroke of the cylinder, the minimum speed occurring substantially at top dead center.

Figure 5:
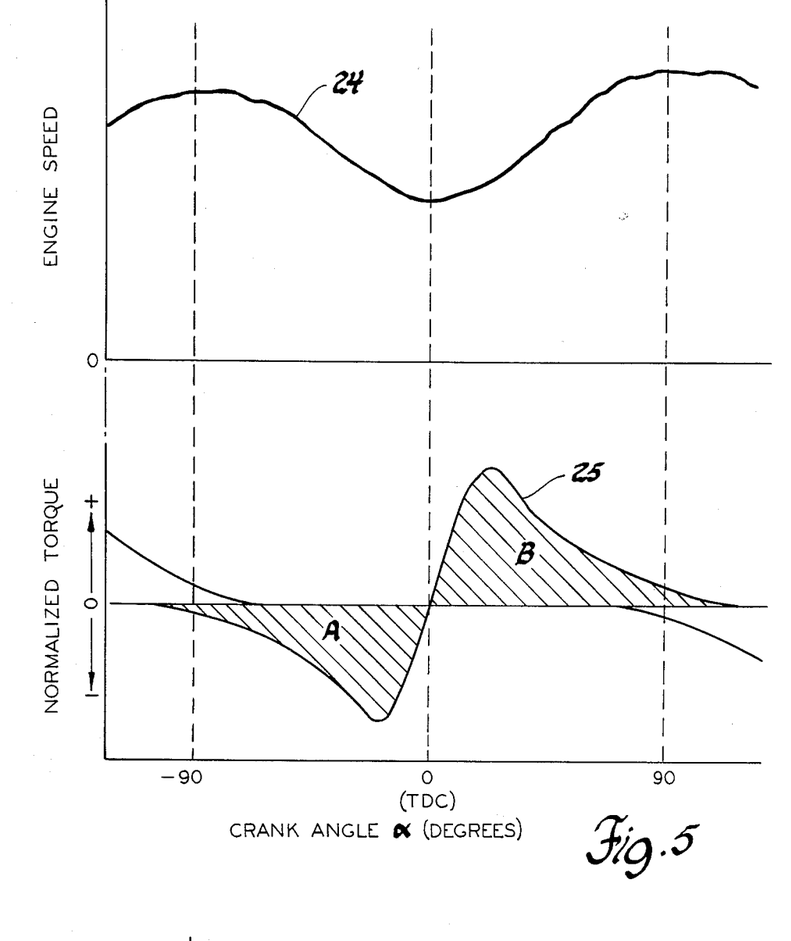
FIG. 5 is a diagram of the normalized torque and the instantaneous engine speed trace associated with one of the cylinders of the engine of FIG. 1.

The lower curve 25 of FIG. 5 is the normalized torque curve for the particular engine type. The integral of the curve 25 from −90° to TDC is the normalized energy coefficient A. The integral of the curve 25 from TDC to 90° is the normalized energy coefficient B for the particular combustion condition which is not predetermined but which will be determined as will be described.

Energy equations defining the engine operation in the compression and power phases can be developed from the curve 25 of FIG. 5. By combining equations (1) and (2), the torque $T(\alpha)$ produced by the engine is defined as follows:

$$T(\alpha) = P_o S r P_n(\alpha) C_T(\alpha) \tag{5}$$

where $P_o$ is the unknown peak pressure due to compression of the cylinder i. The total energy W expended between two crank angles $\alpha_1$ and $\alpha_2$ is defined as follows:

$$W = \int_{\alpha_1}^{\alpha_2} T(\alpha) d\alpha. \tag{6}$$

From equations (5) and (6) and including the energy term resulting from the load torque $T_L$ previously described, the portion of equation (6) that is transformed into kinetic energy is $$W = P_o S r \int_{\alpha_1}^{\alpha_2} P_n(\alpha) C_T(\alpha) d\alpha - \int_{\alpha_1}^{\alpha_2} T_L d\alpha \tag{7}$$

It can be seen that the product $P_n(\alpha) C_T(\alpha)$ is the normalized torque $T_n(\alpha)$ defined in equation (3) above so that if $\alpha_1$, and $\alpha_2$ were −90° and 0° respectively, the integral term of equation (7) becomes the known normalized energy coefficient A. Further, if $\alpha_1$ and $\alpha_2$ were 0° and 90° respectively, the integral term of equation (7) becomes the as yet unknown normalized energy coefficient B.

For the crank angle interval −90° to TDC and assuming $T_L$ a constant, the equation (7) becomes $$W = (P_i S r A) + 90 T_L \tag{8}$$

where $P_i$, the unknown peak compression pressure of the cylinder i, is equal to $P_o$. Similarly, for the crank angle interval TDC to 90°, the equation (7) becomes $$W = (P_i S r B) + 90 T_L \tag{9}$$

There are two unknowns in equation (8). One is the peak pressure $P_i$ due to compression in cylinder i and the other is the energy term W. The value of W is the change in kinetic energy over the 90 crankshaft degree intervals −90 to TDC and TDC to 90, respectively. This change in the kinetic energy over that angular interval can be determined from the instantaneous speed curve 24 of FIG. 5.

The change in kinetic energy from −90° to TDC represented by the speed curve 24 is defined by the following equation:

$$W = I/2[\omega^2 @ 0° - \omega^2 @ -90°], \tag{10}$$

where I is the known equivalent moment of inertia determined as previously described and $\omega$ is the angular velocity of the engine at the respective crank angles of 0° and −90°. The value of W from equation (10) can be substituted into equation (8) so that the only unknown in equation (8) is $P_i$, the peak pressure due to compression of cylinder i which can then be computed.

By determining the value of W for each of the remaining cylinders in its compression phase using equation (10), three additional equations (8) having only the unknown value of the respective peak compression pressure can be developed from which each of the peak compression pressure values are computed.

After the peak compression pressure of a cylinder such as cylinder i has been determined, the power output from that cylinder may be found by first computing the change in kinetic energy during its power phase from the instantaneous speed curve such as curve 24 of FIG. 5 by the expression $$W = I/2[\omega^2 @ 90° - \omega^2 @ 0°]. \tag{11}$$

The value of W determined from equation (11) and the peak compression pressure $P_i$ are then substituted into equation (9) which is then solved for the normalized energy coefficient B. The net energy output for cylinder i is then computed by the expression $$W_i = P_i(A + B) S r. \tag{12}$$

Similarly, the net energy output of the remaining cylinders may be computed. The net power can be computed from equation 12 by dividing $W_i$ by the time to rotate between −90° and +90°.

Referring again to FIG. 1, a diagnostic tool 26 for determining the peak pressure due to compression and the individual power output of each of the cylinders of the engine 10 includes a conventional computer 32 comprised of a microprocessor, a clock, a read-only memory, a random access memory, a power supply unit, an input counter interface and an output interface. The computer 32, upon a manual input command or upon sensing certain engine conditions, executes an operating program stored in its read-only memory. This program includes steps for reading input data and timing intervals via the input counter interface, processing the input data and providing for an output such as to a display 34 via the output interface. The display 34 may take the form of a printer or a video monitor for displaying various information relating to the diagnostic procedure.

The diagnostic tool 26 also includes a probe in the form of an electromagnetic speed sensor 36 positioned adjacent the teeth on the ring gear 12 for providing crankshaft angle and speed information to the computer 32. In this respect, the electromagnetic speed sensing probe 36 senses the passing of the teeth of the ring gear 12 as it is rotated and provides an alternating output to a zero crossing responsive square wave amplifier 38 whose output is a square wave signal at the frequency of the alternating input from the speed sensor 36. This square wave signal is provided to a pulse generator 40 which provides a pulse output with the passing of each tooth on the ring gear 12. Each pulse output of the pulse generator 40 is separated by a crankshaft angle equal to the angular spacing of the teeth on the ring gear 12. Therefore, the time interval between pulses is inversely proportional to engine speed and the frequency of the pulses is directly proportional to engine speed.

Figure 1:
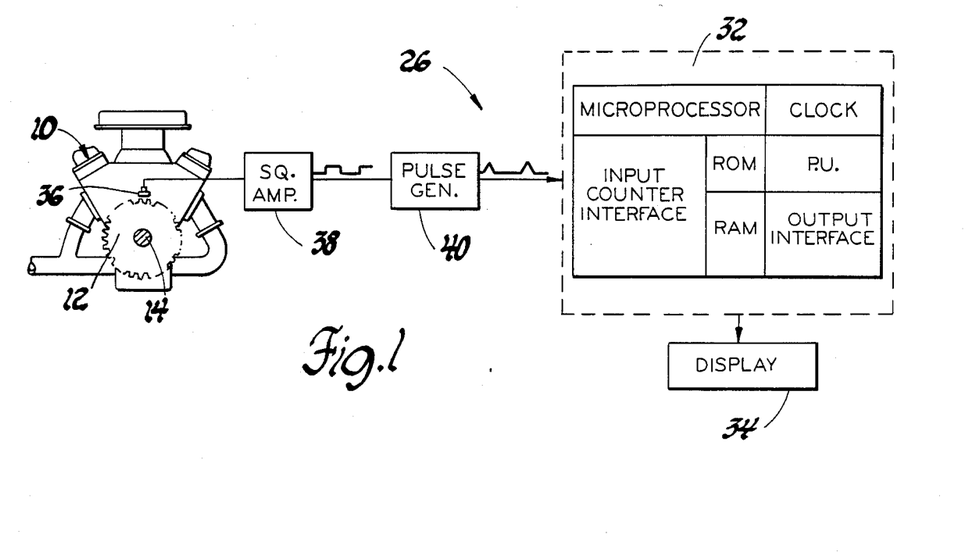
FIG. 1 generally illustrates a diagnostic tool for determining the peak pressure due to compression and the power contribution from each of the individual cylinders of an engine.

In general, the diagnostic tool of FIG. 1 times and records the time interval between successive pulses from the pulse generator 40 corresponding to the time interval between successive crankshaft positions defined by the teeth on the ring gear 12. The number of intervals timed and recorded corresponds to two revolutions of the crankshaft 14 representing one complete engine cycle. Additionally, other parameters may be monitored by the diagnostic tool 26 to provide additional diagnostic information such as described in Applicants' copending patent application Ser. No. 556,790, filed on Dec. 1, 1983.

Top dead center position of the pistons of the engine may be derived from the speed waveform as described in the above-mentioned copending Ser. No. 556,790 and the speed pulses may provide the information to derive crankshaft position information relative to top dead center.

The computer 15 has stored therein the various engine parameters previously described which are utilized along with the instantaneous speed information from the speed sensor 36 to determine peak compression pressure and power output of each cylinder. Those parameters are the engine total load torque $T_L$ as a function of engine speed, the equivalent moment of inertia I of the engine and the normalized energy coefficient A.

Figure 7:
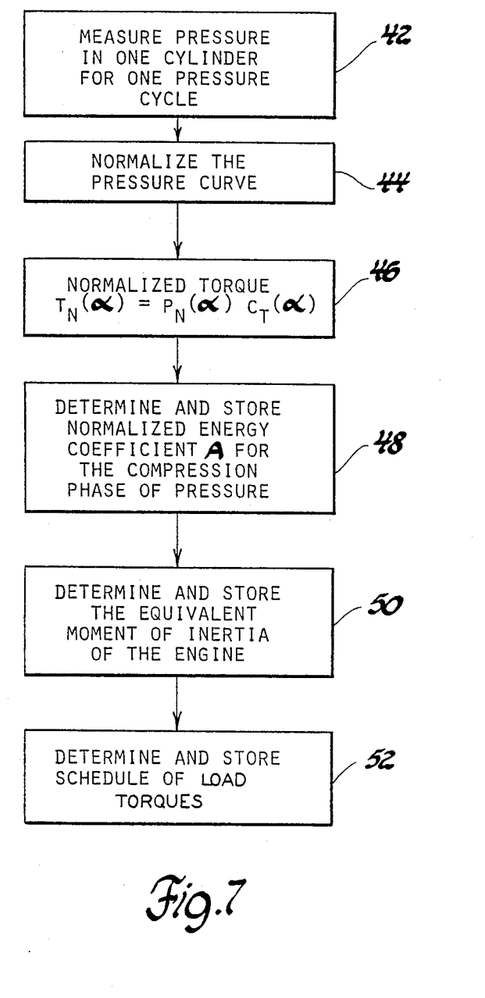
FIG. 7 is a flow diagram illustrating the steps for determining the various engine parameters stored in the diagnostic tool of FIG. 1 and which are used in determining the peak pressure due to compression and power output of each of the cylinders.

Referring to FIG. 7, the steps in preparing the engine parameters stored in the computer 32 are reviewed. At step 42 the pressure in one of the cylinders of an engine of the same type as the engines with which the diagnostic tool will be used is measured for one pressure cycle with combustion timing after top dead center so that the peak pressure represents the actual pressure due to compression in that cylinder. Thereafter, at step 44, the pressure curve is normalized as previously described with reference to FIG. 3.

At step 46 the normalized torque curve is established by multiplying the normalized pressure values by the tangential coefficient as previously described.

Next at step 48 the normalized energy coefficient A is determined by integrating the normalized energy curve over the compression phase of the cylinder and stored in the read-only memory of the computer 32.

At the step 50, the equivalent moment of inertia of the engine is determined and stored in the read-only memory of the computer 32 as previously described. Similarly at step 52 the total load torque for varying idle speeds over a predetermined speed range of the engine is determined and stored in a look-up table in the read-only memory of the computer 32 which is addressed by engine speed.

With the foregoing parameters stored in the diagnostic tool 26, it is then conditioned to diagnose the compression pressure and the power output of each cylinder of the engine 10 or any other engine of the same type to which the stored parameters apply. The diagnostic tool 26 may also include inputs such as from a combustion sensor in order to determine the combustion timing of the engine such as described in Applicants' copending application in Ser. No. 556,790.

Figure 8:
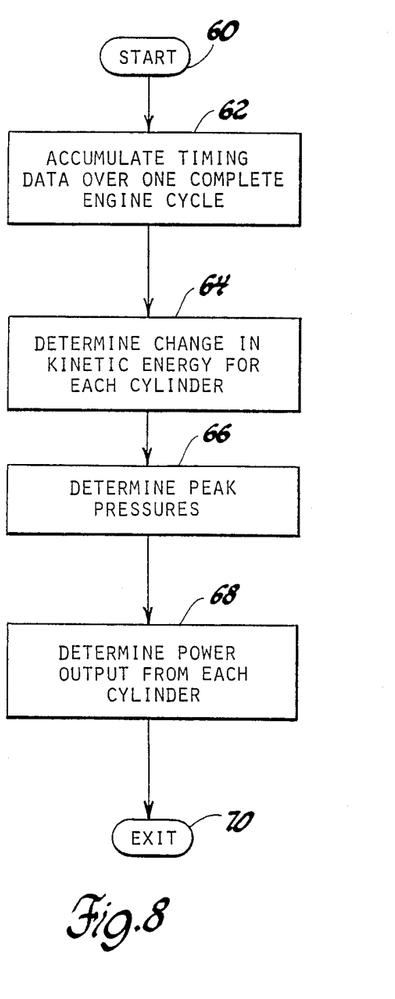
FIG. 8 is a flow diagram illustrating the operation of the diagnostic tool of FIG. 1 in determining the peak pressure due to compression and power output of each of the cylinders of the engine of FIG. 1.

Referring to FIG. 8, the operation of the diagnostic tool 26 for providing a display of the peak compression pressure and power output of each of the cylinders of the engine 10 is illustrated. This procedure is established by the program stored in the read-only memory of the computer 32. The diagnostic program is entered at point 60 and proceeds to a step 62 where the time interval between successive teeth on the ring gear 12 is measured via the input counter interface and stored in a corresponding random access memory location. This data is accumulated for successive teeth on the ring gear 12 for two revolutions of the crankshaft 14 corresponding to one complete engine cycle (in a four-cycle engine).

In general, each timed interval is a digital number having a value equal to the number of clock pulses from the computer clock between pulses from the pulse generator 40. This number represents the time for the crankshaft 14 to rotate through the angle defined by two adjacent teeth on the ring gear 12 and is inversely proportional to speed. Therefore, the numbers stored are representative of instantaneous engine speed. In addition and as described in Applicants' copending application Ser. No. 556,790, the timed intervals may be stored in specified sequential random access memory locations so that the instantaneous speed stored in any given memory location can be associated with a particular crankshaft angle relative to the first time interval. Top dead center positions are then determined from the speed profile. A typical stored profile for a 4-cylinder engine is illustrated in the engine speed curve of FIG. 4.

At step 64, the change in kinetic energy for each cylinder over the crankshaft interval before top dead center and for a predetermined angle after top dead center corresponding to the angular intervals over which the normalized energy coefficient A was determined are calculated as previously described utilizing the expressions in equation 10 and 11. Thereafter at step 66, the change in the kinetic energy during the compression phase of the engine for each cylinder is substituted in equation (8) resulting in 4 equations which are solved to determine the peak compression pressure for each cylinder.

At step 68, the diagnostic tool 68 determines the power output of each cylinder employing the expressions (9) and (12) as previously described. The values determined at 66 and 68 are displayed on the display 34 to provide the diagnostic information concerning cylinder compression pressure and power output. From step 68, the program exits the routine at step 70.

The values provided at the display 34 allow the immediate analysis of the engine operation and provides for an indication of faulty fuel delivery either by individual injectors or the injection pump by monitoring the power output of each cylinder and also provides a compression check. In this manner, the diagnostic information to determine faults in the engine 10 may be provided over a short interval of time simply by positioning a non-obtrusive speed sensor 36 to monitor the instantaneous engine speed. Based on this measured signal and the engine operating parameters stored in the read-only memory of the diagnostic tool 26, the diagnostic information is provided.

In the 4-cylinder embodiment described, the compression and power phases of adjacent cylinders do not overlap to any significant degree. However, in 6 and 8-cylinder engines the positive and negative torques of adjacent cylinders do overlap to a significant degree. In these cases, normalized energy coefficients associated with both power and compression phases must be considered in determining both peak compression pressure and power output. For example, in an 8-cylinder engine, a normalized energy coefficient A associated with the compression stroke of cylinder number i over the 45 degree interval before top dead center and a normalized energy coefficient C associated with the power stroke of the prior cylinder i-1 over the same 45 degree interval must both be considered. The equation (8) then becomes $$W = S_r(P_i A + P_{i-1} C) + 45 T_L \tag{13}$$

where $P_{i-1}$ is the unknown peak compression pressure of cylinder $P_{i-1}$. Normalized energy coefficient C is a stored value based on a schedule of the measured ratio of bottom dead center and top dead center speed values or could be based on an experimentally derived schedule of engine timing and speed values. An equation (13) is developed for each cylinder along with a value for $\omega$ as per equation (10) resulting in eight equations with eight unknown peak compression pressure values which are determined by solving the equations simultaneously.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A nonintrusive method of diagnosing the peak compression pressure in the cylinders of an internal combustion engine having an output crankshaft comprising:
    (A) establishing parameters for a diagnostic tool in preparation for performing a diagnostic peak compression pressure test including the steps of (1) measuring and recording the pressure in a cylinder of an engine of the type to later be diagnosed as a function of the angle $\alpha$ of the crankshaft over at least its compression phase to define a pressure curve $P(\alpha)$, (2) normalizing the pressure curve $P(\alpha)$ so as to have a peak magnitude of unity to define a normalized pressure curve $P_n(\alpha)$, the compression phase of the pressure curve $P_n(\alpha)$ being the same for all cylinders of all engines of the same type, (3) determining the torque transmitted to the crankshaft resulting from the normalized pressure curve $P_n(\alpha)$ to define a normalized torque curve $T(\alpha)$, (4) integrating the normalized torque curve from a predetermined crankshaft angle before top dead center of the cylinder to top dead center to obtain a normalized energy coefficient A, and (5) storing the normalized energy coefficient A for subsequent use in diagnosing engines of the same type and
    (B) diagnosing the peak compression pressure in a cylinder of an engine of the same type including the steps of (1) measuring and recording the instantaneous speed of the engine to be diagnosed at least over the compression phase of the cylinder, (2) determining the change in the kinetic energy W of the engine from the change in the recorded engine speed from the predetermined crankshaft angle before top dead center to top dead center of the cylinder, (3) substituting the determined change in kinetic energy W of the cylinder and the stored normalized energy coefficient A into the expression $W = KAP_i$ where K is a predetermined constant for the engine and $P_i$ is the unknown peak compression pressure of the cylinder, and (4) solving the expression for the peak compression pressure $P_i$ of the cylinder, whereby the peak compression pressure of a cylinder is diagnosed by monitoring solely the instantaneous engine speed associated with the cylinder during engine operation.

2. A nonintrusive method of diagnosing the peak compression pressure in the cylinders of an internal combustion engine having an output crankshaft comprising:
    (A) establishing parameters for a diagnostic tool in preparation for performing a diagnostic peak compression pressure test including the steps of (1) measuring and recording the pressure in a cylinder of an engine of the type to later be diagnosed as a function of the angle $\alpha$ of the crankshaft over at least its compression phase to define a pressure curve $P(\alpha)$, (2) normalizing the pressure curve $P(\alpha)$ so as to have a peak magnitude of unity to define a normalized pressure curve $P_n(\alpha)$, the compression phase of the pressure curve $P_n(\alpha)$ being the same for all cylinders of all engines of the same type, (3) multiplying the normalized pressure curve $P_n(\alpha)$ by a coefficient $C_l(\alpha)$ having a value at each angle $\alpha$ of the crankshaft that defines the portion of the force in the cylinder transmitted to rotational torque on the crankshaft to define a normalized torque curve $T_n(\alpha)$, (4) integrating the normalized torque curve from a predetermined crankshaft angle before top dead center of the cylinder to top dead center to obtain a normalized energy coefficient A, and (5) storing the normalized energy coefficient A for subsequent use in diagnosing engines of the same type and
    (B) diagnosing the peak compression pressure in a cylinder of an engine of the same type including the steps of (1) measuring and recording the instantaneous speed of the engine to be diagnosed at least over the compression phase of the cylinder, (2) determining the change in the kinetic energy W of the engine from the change in the recorded engine speed from the predetermined crankshaft angle before top dead center to top dead center of the cylinder, (3) substituting the determined change in kinetic energy W of the cylinder and the stored normalized energy coefficient A into the expression $W = KAP_i$ where K is a predetermined constant for the engine and $P_i$ is the unknown peak compression pressure of the cylinder, and (4) solving the expression for the peak compression pressure $P_i$ of the cylinder, whereby the peak compression of a cylinder is diagnosed by monitoring solely the instantaneous engine speed associated with the cylinder during engine operation.

3. A nonintrusive method of diagnosing the peak compression pressure and power output of the cylinders of an internal combustion engine having an output crankshaft comprising:
    (A) establishing parameters for a diagnostic tool in preparation for performing a diagnostic peak compression pressure test including the steps of (1) measuring and recording the pressure in a cylinder of an engine of the type to later be diagnosed as a function of the angle $\alpha$ of the crankshaft over at least its compression phase to define a pressure curve $P(\alpha)$, (2) normalizing the pressure curve $P(\alpha)$ so as to have a peak magnitude of unity to define a normalized pressure curve $P_n(\alpha)$, the compression phase of the pressure curve $P_n(\alpha)$ being the same for all cylinders of all engines of the same type, (3) determining the torque transmitted to the crankshaft resulting from the normalized pressure curve $P_n(\alpha)$ to define a normalized torque curve $T_n(\alpha)$, (4) integrating the normalized torque curve over a predetermined crankshaft angular interval to top dead center of the cylinder to obtain a normalized energy coefficient A, and (5) storing the normalized energy coefficient A for subsequent use in diagnosing engines of the same type and (B) diagnosing the peak compression pressure and power output of a cylinder of an engine of the same type including the steps of (1) measuring and recording the instantaneous speed of the engine to be diagnosed over the compression and power phases of the cylinder, (2) determining the change in the kinetic energy $W_1$ of the engine from the change in the recorded engine speed from the predetermined crankshaft angle before top dead center to top dead center of the cylinder, (3) substituting the determined change in kinetic energy $W_1$ of the engine and the stored normalized energy coefficient A into the expression $W_1 = KAP_i$ where K is a predetermined constant for the engine and $P_i$ is the unknown peak compression pressure of the cylinder, (4) solving the expression for the peak compression pressure $P_i$ of the cylinder, (5) determining the change in the kinetic energy $W_2$ of the engine from the change in the recorded engine speed from top dead center of the cylinder to a second predetermined crankshaft angle after top dead center, (6) substituting the change in kinetic energy $W_2$ of the engine and the peak compression pressure $P_i$ into the expression $W_2 = KBP_i$ and solving for B where B is a normalized energy coefficient associated with the power phase of the cylinder, and (7) substituting A and B into the expression $W = P_i \cdot (A + B)K$, where W is the net power output of the cylinder, whereby the peak compression pressure and power output of a cylinder is diagnosed by monitoring solely the instantaneous engine speed associated with the cylinder during engine operation.

4. A method of diagnosing the peak pressure due to compression in the cylinders of an internal combustion engine having an output crankshaft comprising:
establishing parameters for a diagnostic tool including the steps of
(1) measuring and recording the pressure in a cylinder of an engine of the type to be diagnosed as a function of the angular position $\alpha$ of the crankshaft for each of a number of cylinder operating conditions to define a series of pressure curves $P(\alpha)$;
(2) normalizing each of the pressure curves $P(\alpha)$ so as to have a peak magnitude of unity to define a number of normalized pressure curves $P_n(\alpha)$;
(3) determining the torque transmitted to the crankshaft resulting from each normalized pressure curve $P_n(\alpha)$ to define a number of normalized torque curves $T_n(\alpha)$ each having a compression phase and a power phase corresponding to the compression and power phases of a cylinder;
(4) integrating one of the normalized torque curves from a predetermined angular position of the crankshaft before top dead center to top dead center to obtain a normalized energy coefficient A related to the compression phase of the cylinder, the normalized energy coefficient A being a constant for all cylinders of all engines of the type to be diagnosed for all cylinder operating conditions;
(5) integrating each of the normalized torque curves $T_n(\alpha)$ over the portion of the power phase that coincides with the compression phase from the predetermined angular position of the crankshaft before top dead center to top dead center of another cylinder of the engine to define a schedule of energy coefficients B as a function of predetermined cylinder operating conditions; and
(6) storing the normalized energy coefficient A and the schedule of normalized energy coefficients B for subsequent use in diagnosing engines of the same type; and
diagnosing the peak compression pressure in a cylinder of the same type including the steps of
(1) measuring and recording the instantaneous speed of an engine over one complete engine cycle;
(2) for each cylinder (A) determining the change in the kinetic energy W of the engine from the predetermined angular position of the crankshaft before top dead center to top dead center, (B) Determining the predetermined cylinder operating condition, (C) retrieving the value of the normalized energy coefficient B from the stored schedule as a function of the determined cylinder operating condition, and (D) substituting the change in kinetic energy W of the cylinder and the normalized energy coefficients A and B into the expression $W = K(AP_i + BP_{i-1})$ where K is a predetermined constant for the engine, $P_i$ is the unknown peak compression pressure of the cylinder and $P_{i-1}$ is the unknown peak compression pressure of the prior cylinder; and
(3) solving the expressions for the values of the peak compression pressures.

* * * * *

UNITED STATES PATENT AND TRADEMARK OFFICE
CERTIFICATE OF CORRECTION

PATENT NO. :   4,539,841

DATED      :   September 10, 1985

INVENTOR(S) :  Thaddeus Schroeder, William P. Ryan

It is certified that error appears in the above-identified patent and that said Letters Patent is hereby corrected as shown below:

Column 10, Lines 47 and 48, after "compression" insert -- pressure --.

Signed and Sealed this

Fourth Day of November, 1986

[SEAL]

Attest:

DONALD J. QUIGG

*Attesting Officer*    *Commissioner of Patents and Trademarks*